M. O. FRENIER.
HOSE REEL.
APPLICATION FILED JAN. 16, 1914.
1,146,757. Patented July 13, 1915.
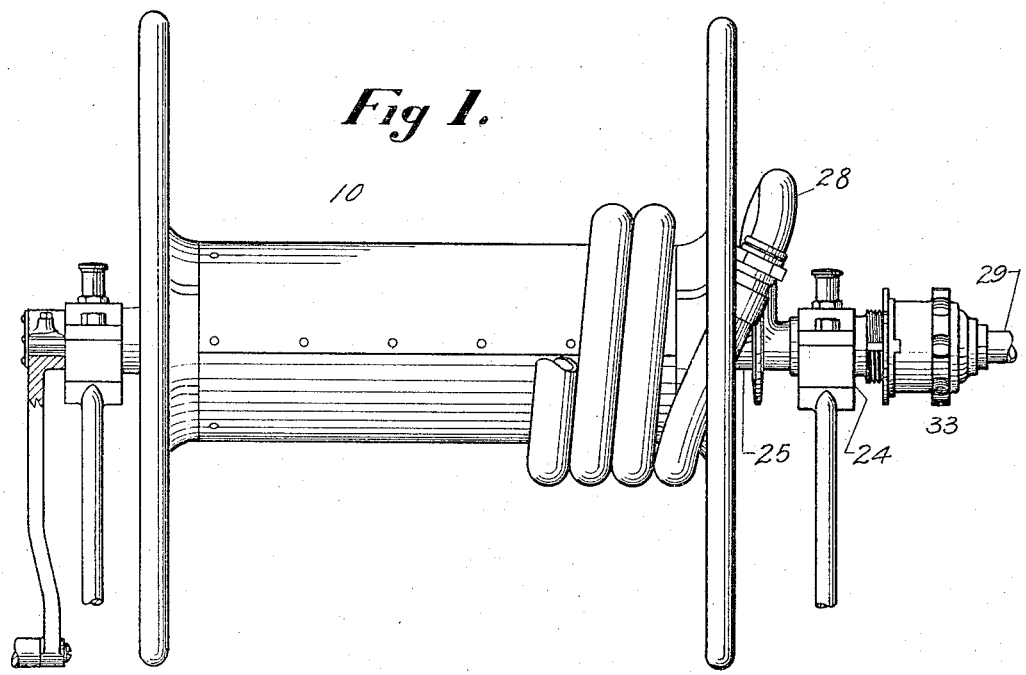
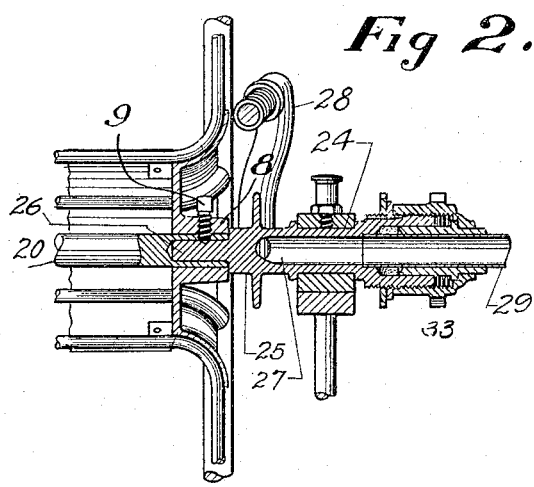
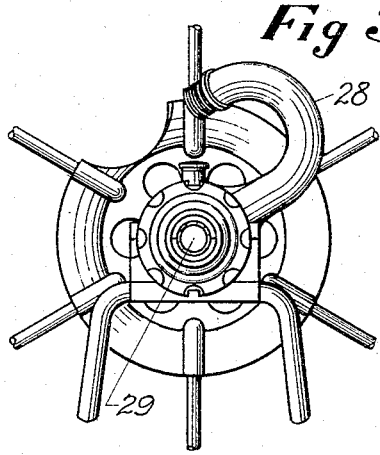
WITNESSES.
INVENTOR.

UNITED STATES PATENT OFFICE.

MAXIME O. FRENIER, OF SPRINGFIELD, MASSACHUSETTS.

HOSE-REEL.

1,146,757. Specification of Letters Patent. Patented July 13, 1915.

Application filed January 16, 1914. Serial No. 812,456.

*To all whom it may concern:*

Be it known that I, MAXIME O. FRENIER, a citizen of the United States, residing at Springfield, in the county of Hampden and State of Massachusetts, have invented new and useful Improvements in Hose-Reels, of which the following is a specification.

My invention relates to improvements in chemical hose reels as used in fire - department equipment.

The object of the invention is to effect a connection between the hose and the chemical-tank such that the hose may be used to discharge the chemicals from the tank without the necessity of unwinding the entire body of hose and to provide improvements in detail of construction for assisting in carrying out the above object.

A further embodiment of the invention resides in a structure wherein the coupling or connection of the hose with the tank will be made outside of the reel-body, for convenience of tightening a loose connection or repairing packing in the coupling without removing the hose from the reel, and in case of leakage at this point, to avoid the chemicals from coming in contact with the hose.

In the further disclosure of the invention, reference is to be had to the accompanying drawings in which, Figure 1 represents a side elevation of the hose-reel with the hose wound thereon. Fig. 2 represents a fragmentary vertical sectional view of reel and fluid conducting member, the hose being removed. Fig. 3 represents a fragmentary end elevation of the reel.

Referring to the views, I provide an auxiliary tubular fluid conveying member 25, journaled on one of the bearings 24, supporting one end of the reel-body 10 by means carried by said member 25, a reduced end 26 projecting into the shaft 20, said shaft having a socket provided therein to receive said projecting end 26. Member 25 is made secure by means of a set-screw 9 carried by one of the hubs 8 to which the fluid conveying member is attached, said set-screw 9 extends through the intermediate portion of the axial-shaft 20 lying between the member 26 and hub 8. Member 25 has a passage 27 therein communicating with the passage at the juncture of the supply-pipe 29. The invention also includes a tubular projection outside of said reel carried by said member 25, and preferably known as a goose-neck 28 and adapted to have a hose 19 connected thereto, a passage therein communicating with the passage 27 and the passage in the supply-pipe 29, and a coupling member 33 for forming a fluid-tight joint at the juncture of the supply-pipe 29 carried by said member 25.

I claim,

In combination a support, a reel, journals secured to the reel and rotatably received in bearings carried by said support, one of said journals comprising a tubular member one end of which is adapted to be rotatably secured to a supply pipe and the other end being fitted in a socket in the end of the reel axle, and a tubular projection on said member outside of the reel body adapted to have a hose connected thereto, said member and projection providing a passage connecting the supply pipe with the hose.

In testimony whereof I affix my signature in presence of two witnesses.

MAXIME O. FRENIER.

Witnesses:
EDMUND N. GRISE,
CHAS. W. POLLNER.

Copies of this patent may be obtained for five cents each, by addressing the "Commissioner of Patents, Washington, D. C."